United States Patent
Sidorov et al.

(10) Patent No.: US 9,912,798 B2
(45) Date of Patent: Mar. 6, 2018

(54) WEARABLE DEVICE WITH RECEPTACLE TO RECEIVE AN AUDIO DEVICE AND METHOD OF OPERATING SAME

(71) Applicant: SANDISK TECHNOLOGIES INC., Plano, TX (US)

(72) Inventors: Alexander Sidorov, Beer Sheva (IL); Arkady Katz, Beer Sheva (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 15/073,390

(22) Filed: Mar. 17, 2016

(65) Prior Publication Data

US 2017/0272562 A1    Sep. 21, 2017

(51) Int. Cl.
| | |
|---|---|
| *H04M 1/72* | (2006.01) |
| *H04M 1/725* | (2006.01) |
| *H04W 4/00* | (2018.01) |
| *H04B 1/3827* | (2015.01) |
| *H04M 1/02* | (2006.01) |

(Continued)

(52) U.S. Cl.
CPC ......... *H04M 1/7253* (2013.01); *H04B 1/385* (2013.01); *H04M 1/0258* (2013.01); *H04M 1/6066* (2013.01); *H04W 4/008* (2013.01); *H04B 2001/3872* (2013.01); *H04M 1/72558* (2013.01); *H04M 2250/02* (2013.01); *H04W 88/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,721,783 A | * | 2/1998 | Anderson | H04B 1/385 |
| | | | | 381/312 |
| 6,212,414 B1 | * | 4/2001 | Alameh | H04B 1/385 |
| | | | | 455/347 |

(Continued)

FOREIGN PATENT DOCUMENTS

| | | |
|---|---|---|
| GB | 2355881 A | 5/2001 |
| WO | 2011157900 A1 | 12/2011 |

OTHER PUBLICATIONS

Aliexpress.com, "Buy Link Dream Smart Watch Detachable Bluetooth V3.0 Smart Headphone/Earphone Headset Reloj Inteligente for Smartphones", viewed Dec. 2, 2015; http://www.aliexpress.com/store/product/Excelvan-Bluetooth-Smart-Bracelet-Sync-Call-S . . . ,13 pp.

(Continued)

*Primary Examiner* — Junpeng Chen
(74) *Attorney, Agent, or Firm* — Toler Law Group, PC

(57) ABSTRACT

An apparatus includes a first transceiver of a wearable device. The first transceiver is configured to communicate using a first communication network having a first communication range. The apparatus further includes a second transceiver of the wearable device. The second transceiver is configured to communicate using a second communication network having a second communication range that is less than the first communication range. The apparatus also includes a receptacle of the wearable device. The receptacle is configured to receive an audio device that is configured to communicate with the second transceiver using the second communication network.

24 Claims, 4 Drawing Sheets

(51) Int. Cl.
*H04M 1/60* (2006.01)
*H04W 88/06* (2009.01)

(56) References Cited

U.S. PATENT DOCUMENTS

| | | | | |
|---|---|---|---|---|
| 7,529,155 | B2* | 5/2009 | Fasciano | G04G 9/0076 |
| | | | | 368/10 |
| 7,618,260 | B2* | 11/2009 | Daniel | A44C 5/0007 |
| | | | | 24/311 |
| 8,036,599 | B2 | 10/2011 | Walley | |
| 8,289,162 | B2 | 10/2012 | Mooring et al. | |
| 9,594,404 | B2* | 3/2017 | Yoon | G01R 33/07 |
| 9,629,774 | B2* | 4/2017 | Dayal | G01C 21/206 |
| 2007/0279852 | A1* | 12/2007 | Daniel | A44C 5/0007 |
| | | | | 361/679.03 |
| 2009/0104940 | A1 | 4/2009 | Seshadri et al. | |
| 2012/0064831 | A1 | 3/2012 | Yu | |
| 2015/0076201 | A1 | 3/2015 | Young et al. | |
| 2015/0189056 | A1* | 7/2015 | Magi | G06F 1/1652 |
| | | | | 455/566 |
| 2015/0223355 | A1* | 8/2015 | Fleck | G06F 1/163 |
| | | | | 361/679.03 |
| 2016/0039424 | A1* | 2/2016 | Hong | B60W 40/08 |
| | | | | 701/2 |
| 2016/0210834 | A1* | 7/2016 | Dayal | G08B 21/02 |
| 2016/0357510 | A1* | 12/2016 | Watson | G06F 3/165 |

OTHER PUBLICATIONS

Amazon.com, Link Dream Smartwatch Bluetooth V3.0 by Nova Tech US:, viewed Dec. 7, 2015; http://www.amazon.com/Smartwatch-Bluetooth-Headset-Separate-Design/product-reviews . . . ,3 pp.

International Search Report and Written Opinion dated Jun. 22, 2017, in International Application No. PCT/US2017/019623, 16 pages.

* cited by examiner

WEARABLE DEVICE WITH RECEPTACLE TO RECEIVE AN AUDIO DEVICE AND METHOD OF OPERATING SAME

FIELD OF THE DISCLOSURE

This disclosure is generally related to wearable devices and more particularly to a wearable device that includes a receptacle to receive an audio device.

BACKGROUND

Cellular phones and other electronic devices may enable a user to send and receive information using a network. For example, a cellular phone may enable a user to send and receive voice signals and data using a wireless network.

Some electronic devices are wearable, which may be convenient for a user. To illustrate, a "smart watch" may enable a user to access audio content (e.g., by connecting headphones to an audio jack of the smart watch or using a "built-in" speaker of the smart watch). Connecting headphones to the audio jack may be inconvenient, and use of a built-in speaker may result in poor audio quality and lack of privacy.

Further, certain operations may be inconvenient using a smart watch. For example, a smart watch may provide cellular connectivity to a user by connecting to a cellular phone. Dialing and answering calls using multiple devices (e.g., a smart watch and a cellular telephone) may be inconvenient for a user.

DETAILED DESCRIPTION

Figure 1:
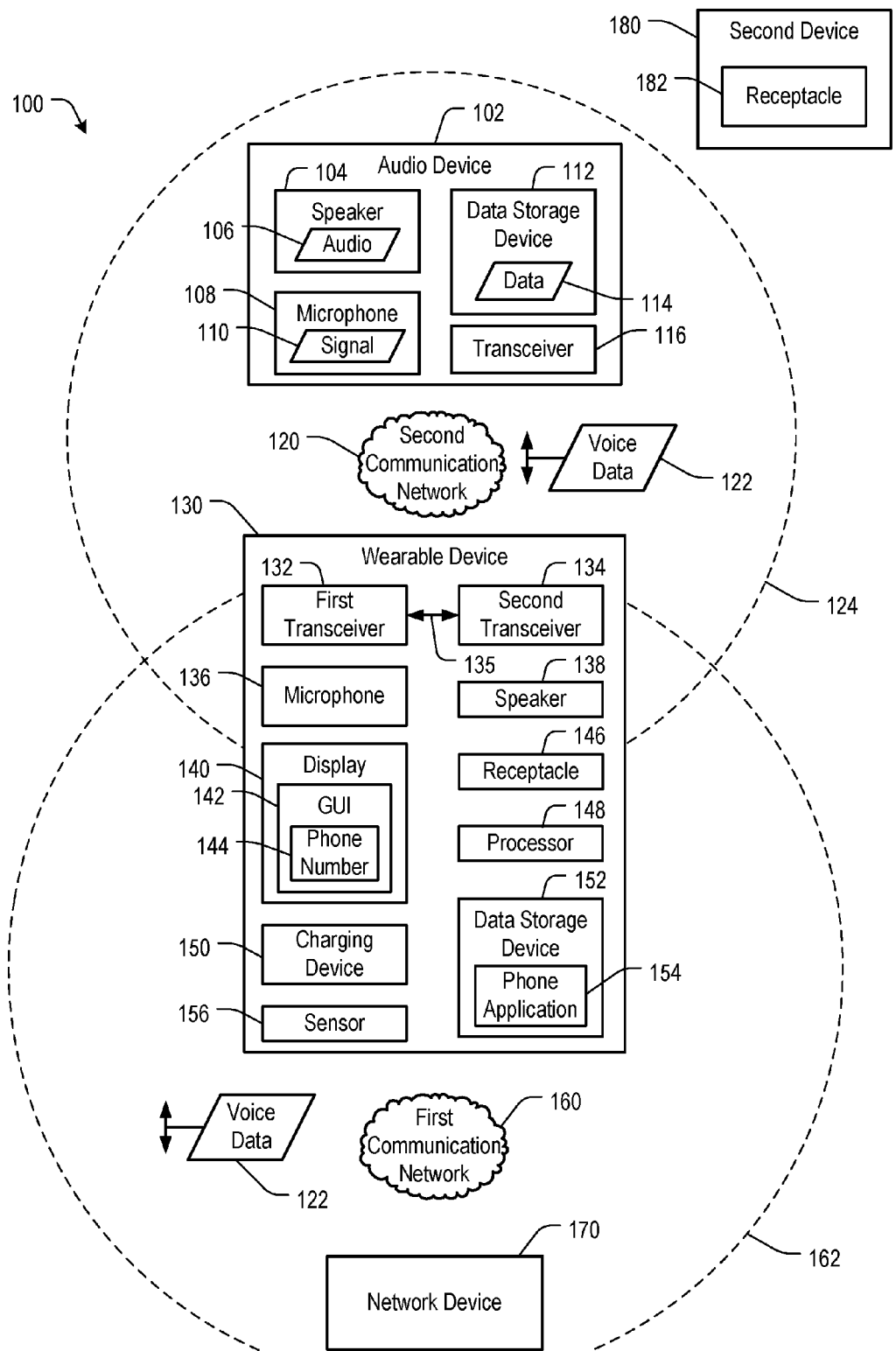
FIG. 1 is a diagram of a particular illustrative example of a system including a wearable device having a receptacle to receive an audio device.

A wearable device (e.g., a smart watch) includes a receptacle to receive an audio device, such as a wireless headset that includes a speaker and a microphone. The wearable device may initiate an operation in response to detecting removal of the audio device from the receptacle. For example, the wearable device may load a phone application to enable a user to place an outgoing call (e.g., to a particular telephone number) in response to detecting removal of the audio device from the receptacle. As another example, the wearable device may answer an incoming call in response to detecting removal of the audio device from the receptacle. Alternatively or in addition, the wearable device may terminate a call in response to detecting insertion of the audio device into the receptacle.

Use of a receptacle of a wearable device to receive an audio device may enhance a user experience. For example, a user experience may be enhanced by automatically loading a phone application, automatically answering a call, or automatically terminating a call based on a change of position of the audio device relative to the receptacle. As another example, the receptacle and the audio device may provide convenience associated with a "built-in" speaker and/or microphone (e.g., by enabling the user to avoid carrying a separate pair of wired headphones) while also providing privacy associated with a wired connection.

The wearable device includes multiple transceivers. For example, the wearable device may include a first transceiver to communicate using a cellular network (e.g., to send and receive calls) and may further include a second transceiver to communicate with the audio device (e.g., by relaying voice data received by the first transceiver to the audio device and vice versa). The multiple transceivers may enhance user experience and convenience, such as by enabling a user to carry a single wearable device with cellular connectivity (instead of carrying both a wearable device and a cellular phone).

In addition, the receptacle may facilitate charging of the audio device. For example, when the audio device is not in use, a battery of the audio device may be charged using a charging device (e.g., a set of contacts or a set of coils) that provides power to the battery of the audio device. In this example, when a user removes the audio device (e.g., to place the audio device in-ear to initiate or answer a call), charging of the audio device may terminate. Charging of the audio device may resume in response to insertion of the audio device in the receptacle (e.g., by returning the audio device to the receptacle to terminate the call).

The audio device may optionally include a data storage device to store data received from the wearable device. For example, the data storage device may function as auxiliary storage for the wearable device. In some implementations, the audio device may share data (e.g., images or other information) stored by the data storage device upon insertion of the audio device into a receptacle of a second device (e.g., another wearable device or other electronic device). Sharing data using the data storage device of the wearable device may simplify sharing of user data, such as by enabling users of wearable devices to "swap" audio devices to share data instead of setting up a network between the wearable devices or connecting a physical cable to the wearable devices.

Particular aspects of the disclosure are described below with reference to the drawings. In the description, common or similar features may be designated by common reference numbers. As used herein, "exemplary" may indicate an example, an implementation, and/or an aspect, and should not be construed as limiting or as indicating a preference or a preferred implementation.

Referring to FIG. 1, a particular illustrative example of a system is depicted and generally designated 100. The system 100 may include an audio device 102 (e.g., a wireless headset device, such as an ear bud device), a wearable device 130 (e.g., a smart watch or other wearable device), and a network device 170 (e.g., a base station device).

The audio device 102 may be wearable by a user. For example, the audio device 102 may have a shape to enable the audio device 102 to be positioned in an ear of a user. In another example, the audio device 102 may include a clip configured to attach to an outer ear of a user or a head-mounting device configured to attach across the head of a user. The audio device 102 may include one or more speakers (e.g., a speaker 104), one or more microphones (e.g., a microphone 108), and a transceiver 116. The audio device 102 may also include a data storage device 112, a processor, a battery, or a combination thereof.

The wearable device 130 may include a first transceiver 132 and a second transceiver 134. The first transceiver 132 may be coupled to the second transceiver 134, such as via a bus 135. The wearable device 130 may include a microphone 136 (e.g., a "built-in" microphone), a speaker 138 (e.g., a "built-in" speaker), a display 140 (e.g., a touchscreen display or other display device), and a receptacle 146 (e.g., a cavity, such as a slot to receive an earbud device).

The receptacle 146 may be configured to receive the audio device 102. To illustrate, the receptacle 146 may have a shape corresponding to a shape of the audio device 102 to enable the audio device 102 to fit in the receptacle 146. For example, the audio device 102 may include an earbud device, and the shape of the receptacle 146 may correspond to the shape of the earbud device. In some implementations, the wearable device 130 may include one or more latching devices to secure the audio device 102 in the receptacle 146. As a non-limiting illustrative example, the wearable device 130 may include a "tab" that is engaged by the audio device 102 upon insertion of the audio device 102 into the receptacle 146 (e.g., so that the tab presses against a lip of the audio device 102). In this illustrative example, a user may press the tab to remove the audio device 102 from the receptacle 146 (e.g., to "release" the tab from the lip of the audio device 102). Alternatively or in addition, the audio device 102 may include a plug (e.g., at a bottom surface of the audio device 102) that may be inserted into a recess at a bottom of the receptacle 146 and that may be released by pulling the audio device 102 from the receptacle 146. Alternatively or in addition, the audio device 102 may include a recess, and the receptacle 146 may include a plug to be inserted into the recess. In some implementations, the wearable device 130 may include a spring-loaded device (e.g., a spring-loaded clip) configured to disengage the audio device 102 from the receptacle 146 upon activation of the spring-loaded device by a user. Alternatively or in addition, the audio device 102 and the receptacle 146 may each include a set of contacts or a set of coils (e.g., to facilitate charging of the audio device 102), as described further with reference to FIGS. 3 and 4.

The wearable device 130 may further include a processor 148, a charging device 150, a data storage device 152, and a sensor 156. The charging device 150 may include a battery and one or more connections to charge the audio device 102, such as a set of coils or a set of contacts.

The first transceiver 132 may be configured to communicate with the network device 170 via a first communication network 160. For example, the first communication network 160 may correspond to a wide area network (WAN) or a cellular network. The network device 170 may include a cellular tower and/or a base station, as illustrative examples. The first transceiver 132 may be associated with a first communication range 162.

The second transceiver 134 may be configured to communicate with the audio device 102 using a second communication network 120. For example, the second transceiver 134 and the transceiver 116 may communicate using a Bluetooth® communication protocol (Bluetooth® is a registered trademark of Bluetooth Special Interest Group (SIG), Inc.), and the second communication network 120 may correspond to a Bluetooth network. In this example, the transceivers 116, 134 may be Bluetooth-compliant transceivers. In another implementation, the transceivers 116, 134 may comply with an Institute of Electrical and Electronics Engineers (IEEE) 802.11 communication protocol, a WiFi communication protocol, another communication protocol, or a combination thereof.

The second transceiver 134 may be associated with a second communication range 124. The second communication range 124 may be less than the first communication range 162. For example, the first transceiver 132 may be associated with a higher power consumption as compared to the second transceiver 134, which may result in a greater communication range.

During operation, the wearable device 130 may initiate an operation associated with a call in response to detecting removal of the audio device 102 from the receptacle 146. To illustrate, the operation may be initiated by a user removing the audio device 102 from the receptacle 146 either to initiate a phone call using the first communication network 160 or to answer a phone call using the first communication network 160. To further illustrate, the call may be associated with information (e.g., a phone number 144) that is presented via a graphical user interface (GUI) 142 at the display 140.

In response to initiating the operation, the wearable device 130 may receive voice data 122 (e.g., a cellular call) from the network device 170. In some implementations, the first transceiver 132 may provide the voice data 122 (e.g., a representation of an acoustic voice signal) to the second transceiver 134 (e.g., via the bus 135), and the second transceiver 134 may send the voice data 122 to the transceiver 116. The transceiver 116 may provide the voice data 122 (or a representation of the voice data 122) to the speaker 104, which may generate audio 106 (e.g., an acoustic voice signal). To illustrate, the wearable device 130 may perform transcoding of the voice data 122 from a first format to a second format associated with the audio device 102 (e.g., from a format associated with the first communication network 160 to a format associated with the second communication network 120) to generate the representation of the voice data 122. The wearable device 130 may generate a prompt in response to the call. For example, the wearable device 130 may present an incoming call prompt via the display 140, a ringtone via the speaker 104 or the speaker 138, or a combination thereof.

Alternatively or in addition, the microphone 108 may generate a signal 110 in response to speech from a user (e.g., speech during a call). The audio device 102 may generate the voice data 122 based on the signal 110 (e.g., by digitizing the signal 110), and the transceiver 116 may send the voice data 122 to the second transceiver 134. In this example, the second transceiver 134 may provide the voice data 122 to the first transceiver 132 (e.g., via the bus 135), and the first transceiver 132 may send the voice data 122 to the network device 170 using the first communication network 160.

In an illustrative implementation, the sensor 156 is configured to detect insertion and/or removal of the audio device 102 at the receptacle 146. The sensor 156 may include one or more of a set of contacts, an optical sensor, a magnetic sensor, a set of coils, another device, or a combination thereof. The sensor 156 may share one or more components with the charging device 150, such as a set of contacts or a set of coils used by the sensor 156 to detect insertion or removal of the audio device 102 from the receptacle 146 and used by the charging device 150 to charge the audio device 102 upon insertion of the audio device 102 into the receptacle 146. Certain illustrative aspects of the charging device 150 and the sensor 156 are described further with reference to FIGS. 3 and 4.

In some examples, initiating the operation associated with the call may include loading a phone application 154 (e.g., a "dialer" application), such as by retrieving the phone application 154 from the data storage device 152 and by providing the phone application 154 to the processor 148. To further illustrate, the display 140 may receive user input via the GUI 142 indicating that the wearable device 130 is to load the phone application 154. In response to the user input, the processor 148 may retrieve that phone application 154 from the data storage device 152. The processor 148 may execute the phone application 154 to present a portion of the GUI 142 that enables the user to view or to enter the phone number 144.

In some implementations, the processor 148 is configured to read and write data 114 to the data storage device 112. In some implementations, the processor 148 is configured to provide the data 114 to the second transceiver 134 to be sent to the data storage device 112 via the second communication network 120. In this example, the audio device may receive the data 114 using the transceiver 116. Alternatively or in addition, the processor 148 may be configured to provide the data 114 to the data storage device 112 upon insertion of the audio device 102 into the receptacle 146 using a wired connection between the wearable device 130 and the audio device 102.

In some implementations, the audio device 102 may include a processor configured to access the data 114. As an illustrative example, the processor may include a digital signal processor (DSP) that decodes the data 114 (e.g., to generate an analog signal based on the data 114) and that provides the analog signal to the speaker 104 to generate audio content (e.g., music). In this example, the data 114 may include content having an audio file format (e.g., an mp3 file format).

Alternatively or in addition, the data 114 may include other content. For example, the data storage device 112 may function as an auxiliary memory for the wearable device 130, and the wearable device 130 may store or backup data (e.g., user data, control information associated with operation of the wearable device 130, or both) at the data storage device 112.

The audio device 102 may be configured to share the data 114 with a second device 180 (e.g., a wearable device, such as a smart watch, or another electronic device). For example, the audio device 102 may provide the data 114 to the second device 180 by sending the data 114 via the second communication network 120 (or another network) using the transceiver 116. Alternatively or in addition, the audio device 102 may be configured to provide the data 114 to the second device 180 upon insertion of the audio device 102 into a receptacle 182 of the second device 180.

Use of the receptacle 146 to receive the audio device 102 may enhance user experience. For example, user experience may be enhanced by automatically loading the phone application 154, automatically answering a call, or automatically terminating a call based on a change of position of the audio device 102 relative to the receptacle 146. As another example, the receptacle 146 and the audio device 102 may provide convenience associated with a "built-in" speaker and/or microphone (e.g., by enabling the user to avoid carrying a separate pair of wired headphones) while also providing privacy associated with a wired connection. In addition, the transceivers 132, 134 may enhance user experience by enabling a user to carry a single wearable device with cellular connectivity. Further, the data storage device 112 may provide additional storage (e.g., by functioning as auxiliary storage for the wearable device 130) and may simplify sharing of data with another device, such as enabling the second device 180 to access the data 114 upon insertion of the audio device 102 in the receptacle 182.

Figure 2:
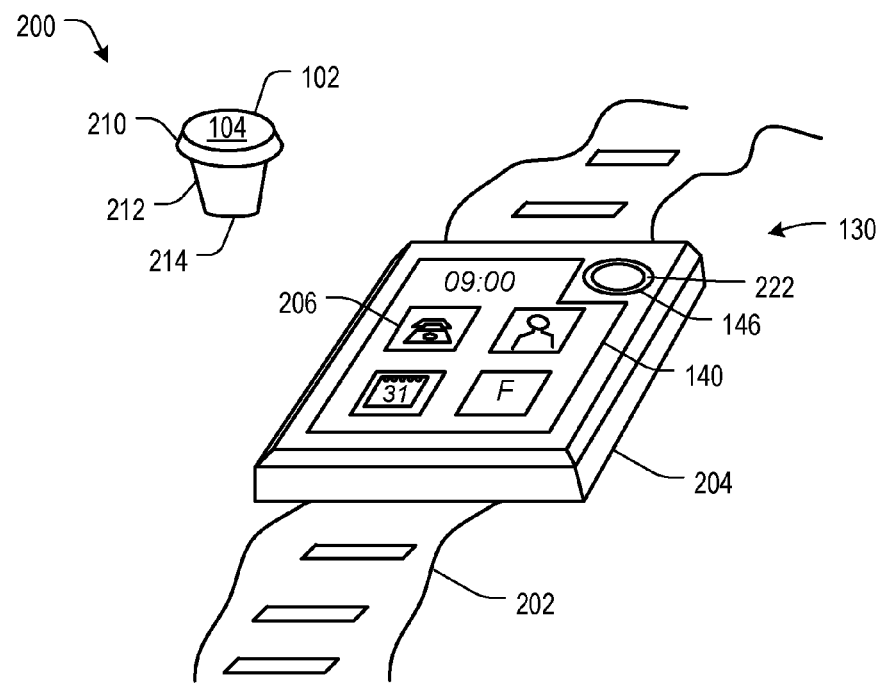
FIG. 2 is a diagram that depicts illustrative configurations of the wearable device and the audio device of FIG. 1.
Figure 2:
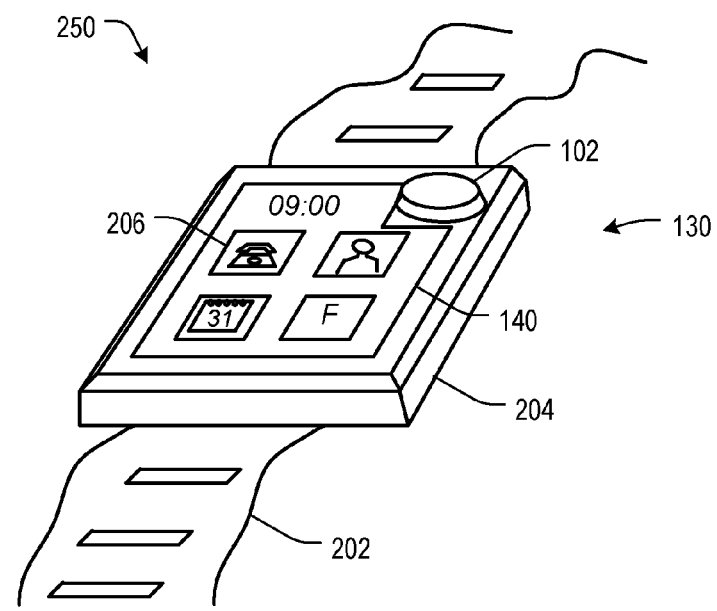

FIG. 2 depicts a first configuration 200 of the audio device 102 and the wearable device 130. FIG. 2 also depicts a second configuration 250 of the audio device 102 and the wearable device 130. In the example of FIG. 2, the wearable device 130 corresponds to a watch (e.g., a smart watch) that includes a wrist-based device 202 (e.g., a wrist strap) configured to attach to a wrist of a user.

FIG. 2 also illustrates that the audio device 102 may have an "earbud" configuration and may be configured to be inserted in an ear of a user. For example, the audio device 102 may include the speaker 104 mounted on a surface (e.g., a top surface) of the audio device 102. The audio device 102 may include a lip 210, which may be configured to rest against an upper surface 222 of the receptacle 146 when the audio device 102 is inserted in the receptacle 146. Alternatively or in addition, the lip 210 may be engaged by a latching device (e.g., a tab) of the wearable device 130 to secure the audio device 102. The audio device 102 may further include a base portion 212 and a bottom surface 214.

In the first configuration 200, the audio device 102 is removed from the receptacle 146. For example, a user may remove the audio device 102 from the receptacle 146 in order to initiate or to answer a call. The first configuration 200 also illustrates that the wearable device 130 may include a housing 204 and that the display 140 may be mounted on the housing 204. In the example of FIG. 2, the GUI 142 of FIG. 1 may include one or more icons or other features presented via the display 140. As an example, the display 140 may present an icon 206 associated with the phone application 154 of FIG. 1.

The second configuration 250 depicts that the audio device 102 may be inserted in the receptacle 146. For example, the audio device 102 may be inserted in the receptacle 146 by a user in order to terminate (e.g., hang up) a phone call.

The example of FIG. 2 may increase convenience of a wearable device for a user. For example, the audio device 102 may have an "earbud" configuration that enables the audio device 102 to be inserted in the receptacle 146 when not in use. Further, use of the audio device 102 may reduce an amount of exposure to electromagnetic radiation by a user (as compared to holding a cellular phone proximate to an ear of the user, in which case a cellular transceiver may be closer to the ear of the user).

Figure 3:
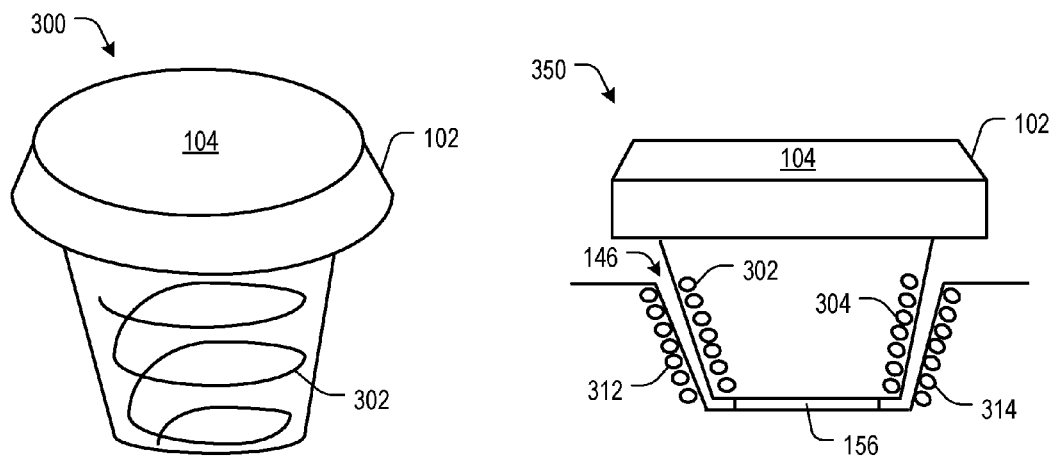
FIG. 3 is a diagram illustrating a first example of the wearable device and the audio device of FIG. 1.

FIG. 3 illustrates a perspective view 300 and a profile view 350 of an illustrative example of the audio device 102. In the example of FIG. 3, the audio device 102 includes the speaker 104 mounted or attached to a top surface of the audio device 102. The audio device 102 may also include one or more coils, such as a first coil 302 and a second coil 304.

Upon insertion of the audio device 102 in the receptacle 146, the coils 302, 304 may form an electrical or magnetic connection with a third coil 312 and a fourth coil 314 of the wearable device 130. Upon insertion of the audio device 102 in the receptacle 146, the coils 302, 304, 312, and 314 may be magnetically coupled. FIG. 3 also depicts that the sensor 156 of FIG. 1 may be mounted at a bottom surface of the receptacle 146.

Magnetically coupling the coils 302, 304, 312, and 314 may enable the sensor 156 to detect insertion of the audio device 102 in the receptacle 146. Alternatively or in addition, the coils 302, 304, 312, and 314 may be used as an electrical connection to exchange data between the audio device 102 and the wearable device 130, such as the data 114 of FIG. 1. Alternatively or in addition, the coils 302, 304, 312, and 314 may be used to charge a battery of the audio device 102, such as via magnetic induction.

Figure 4:
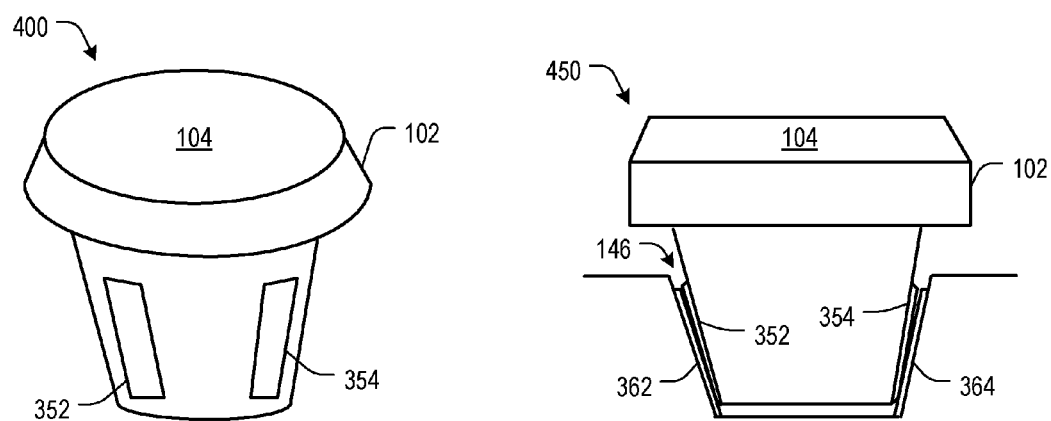
FIG. 4 is a diagram illustrating a second example of the wearable device and the audio device of FIG. 1.

FIG. 4 illustrates a perspective view 400 and a profile view 450 of another example of the audio device 102. In the example of FIG. 4, the audio device 102 includes one or more contacts, such as a first contact 352 and a second contact 354.

Upon insertion of the audio device 102 in the receptacle 146, the first contact 352 may be connected to a third contact 362 of the wearable device 130. In addition, the second contact 354 may be connected to a fourth contact 364 of the wearable device 130.

In an illustrative example, the sensor 156 of FIG. 1 may be configured to detect the audio device 102 using the contacts 352, 354, 362, and 364. Alternatively or in addition, the processor 148 of the wearable device 130 and/or the first transceiver 132 may communicate with the audio device 102 using the contacts 352, 354, 362, and 364. Alternatively or in addition, the contacts 352, 354, 362, and 364 may be used to charge a battery of the audio device 102.

Figure 5:
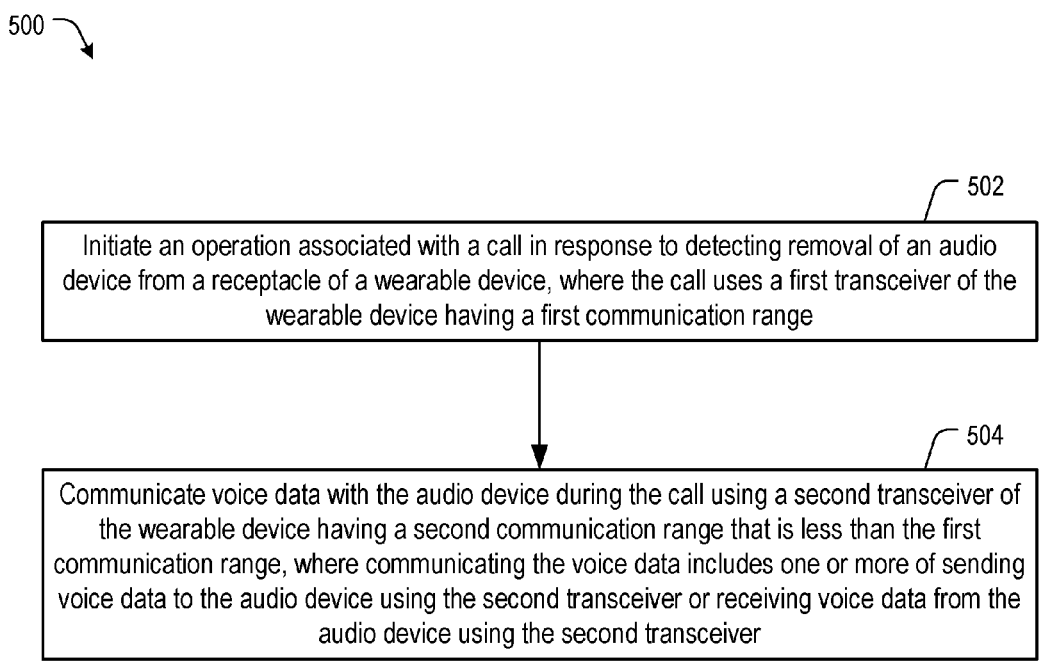
FIG. 5 is a flow chart of a particular illustrative embodiment of a method of operation of the wearable device of FIG. 1.

Referring to FIG. 5, an illustrative example of a method is depicted and generally designated 500. The method 500 may be performed by a wearable device, such as the wearable device 130.

The method 500 includes initiating an operation associated with a call in response to detecting removal of an audio device from a receptacle of a wearable device, at 502. The call uses a first transceiver of the wearable device having a first communication range. To illustrate, the audio device may correspond to the audio device 102, and the receptacle may correspond to the receptacle 146. To further illustrate, the first transceiver may correspond to the first transceiver 132, and the first communication range may correspond to the first communication range 162.

In an illustrative example, initiating the operation includes loading a phone application (e.g., the phone application 154) at the wearable device in response to detecting removal of the audio device. The method 500 may optionally include receiving an indication of a target phone number (e.g., the phone number 144) via the phone application and may also include placing the call to the target phone number using the first transceiver.

In another illustrative example, initiating the operation includes answering the call. The method 500 may optionally include generating a ring tone (e.g., by the speaker 138) associated with the call.

The method 500 further includes receiving voice data from the audio device during the call using a second transceiver of the wearable device, at 504. The second transceiver has a second communication range that is less than the first communication range, and communicating the voice data includes one or more of sending voice data to the audio device using the second transceiver or receiving voice data from the audio device using the second transceiver. To illustrate, the second transceiver may correspond to the second transceiver 134, and the second communication range may correspond to the second communication range 124.

The method 500 may optionally include terminating the call in response to detecting insertion of the audio device into the receptacle. A charging operation may be initiated to charge the audio device in response to detecting insertion of the audio device into the receptacle. For example, the charging device 150 may charge a battery of the audio device 102 by supplying a voltage to the battery using the coils 302, 304, 312, and 314 or using the contacts 352, 354, 362, and 364.

In connection with the described embodiments, an apparatus includes means (e.g., the first transceiver 132) for communicating at a wearable device (e.g., the wearable device 130) using a first communication network associated with a first communication range. To illustrate, the first communication network may correspond to the first communication network 160, and the first communication range may correspond to the first communication range 162. The apparatus further includes means (e.g., the second transceiver 134) for communicating at the wearable device using a second communication network associated with a second communication range that is less than the first communication range. For example, the second communication network may correspond to the second communication network 120, and the second communication range may correspond to the second communication range 124. The apparatus further includes means (e.g., the receptacle 146) for receiving an audio device (e.g., the audio device 102) configured to communicate using the second communication network. The apparatus may optionally include means (e.g., the wrist-based device 202) for securing the wearable device to a wrist of a user.

Although various components depicted herein are illustrated as block components and described in general terms, such components may include one or more microprocessors, state machines, or other circuits configured to enable such components to perform one or more operations described herein. For example, the wearable device 130 may include physical components, such as hardware controllers, state machines, logic circuits, or other structures, to enable the wearable device 130 to perform operations, such as operations of the method 500 of FIG. 5.

Alternatively or in addition, the wearable device 130 may be implemented using a microprocessor or microcontroller programmed to perform operations, such as operations of the method 500 of FIG. 5. In a particular example, the processor 148 is configured to execute instructions (e.g., firmware) that are stored at the data storage device 152. Alternatively, or in addition, executable instructions that are executed by the processor may be stored at a separate memory location that is not part of the data storage device 152, such as at a read-only memory (ROM) of the wearable device 130, at the data storage device 112, or both, as illustrative examples.

In some implementations, the data storage device 152 may be embedded within the wearable device 130. For example, the data storage device 152 may be embedded within the wearable device 130 in accordance with a Joint Electron Devices Engineering Council (JEDEC) Solid State Technology Association Universal Flash Storage (UFS) configuration or in accordance with an embedded MultiMedia Card (eMMC) specification. Further, the data storage device 112 may be embedded within the audio device 102, such as in accordance with a JEDEC Solid State Technology Association UFS configuration or in accordance with an eMMC specification.

In one or more other implementations, the data storage device 152 may be removable from the wearable device 130 (i.e., "removably" coupled to the wearable device 130). As an example, the data storage device 152 may be removably coupled to the wearable device 130 in accordance with a removable universal serial bus (USB) configuration. Further, the data storage device 112 may be removable from the audio device 102 (i.e., "removably" coupled to the audio device 102), such as in accordance with a removable USB configuration. As another example, the data storage device 152 and/or the data storage device 112 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.).

The data storage device 152 and/or the data storage device 112 may include a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), another type of memory, or a combination thereof. The data storage device 152 and the data storage device 112 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus comprising:
   a first transceiver of a first wearable device, the first transceiver configured to communicate using a first communication network having a first communication range;
   a second transceiver of the first wearable device, the second transceiver configured to communicate with an audio device using a second communication network having a second communication range that is less than the first communication range;
   a first receptacle of the first wearable device, the first receptacle configured to receive the audio device; and
   an interface of the first wearable device, the interface configured to form a magnetic connection with the audio device while the audio device is at least partially within the first receptacle and to provide data using the magnetic connection to be stored at a non-volatile memory of the audio device to enable the audio device to provide the data to a second wearable device upon insertion of the audio device at a second receptacle of the second wearable device.

2. The apparatus of claim 1, further comprising a display of the first wearable device.

3. The apparatus of claim 2, wherein the audio device is configured to generate audio, and wherein the display is configured to present a graphical user interface (GUI) including information associated with the audio.

4. The apparatus of claim 1, wherein the audio device includes a speaker configured to generate an acoustic voice signal in response to voice data received from the second transceiver, and wherein the first transceiver is further configured to provide a representation of the acoustic voice signal to the second transceiver.

5. The apparatus of claim 1, wherein the audio device includes a microphone configured to generate a signal in response to speech.

6. The apparatus of claim 5, further comprising a bus coupled to the first transceiver and to the second transceiver, wherein the second transceiver is further configured to provide voice data associated with the signal to the first transceiver using the bus.

7. The apparatus of claim 6, wherein the second transceiver is further configured to send the voice data to a base station device using the second communication network.

8. The apparatus of claim 1, wherein the audio device includes an earbud device having a shape corresponding to a shape of the first receptacle to enable the first receptacle to receive the audio device.

9. The apparatus of claim 1, wherein the interface is further configured to perform a data transfer operation with the non-volatile memory using the magnetic connection to read the data from or to write the data to the non-volatile memory upon engagement of the audio device at the first receptacle.

10. The apparatus of claim 1, further comprising:
    a memory of the first wearable device; and
    a processor of the first wearable device, the processor coupled to the memory and configured to retrieve a phone application from the memory upon detecting removal of the audio device from the first receptacle.

11. The apparatus of claim 1, wherein the interface includes a first plurality of coils configured to form the magnetic connection with a second plurality of coils of the audio device.

12. The apparatus of claim 11, wherein the first plurality of coils is further configured to charge the audio device and to communicate the data with the audio device.

13. The apparatus of claim 1, further comprising a sensor of the first wearable device, the sensor configured to detect, based on the magnetic connection, insertion of the audio device at the first receptacle.

14. The apparatus of claim 1, further comprising a device configured to retain the audio device at the first receptacle, the device including one or more of a plug configured to engage a protrusion of the audio device or a latching device configured to engage a lip of the audio device.

15. The apparatus of claim 1, further comprising a memory of the first wearable device, wherein the non-volatile memory of the audio device corresponds to auxiliary memory of the first wearable device.

16. A method comprising:
    initiating an operation associated with a call in response to detecting removal of an audio device from a first receptacle of a first wearable device, wherein the call uses a first transceiver of the first wearable device, the first transceiver having a first communication range;
    communicating voice data with the audio device during the call using a second transceiver of the first wearable device, the second transceiver having a second communication range that is less than the first communication range, wherein communicating the voice data includes one or more of sending voice data to the audio device using the second transceiver or receiving voice data from the audio device using the second transceiver;

generating a magnetic field using an interface of the first wearable device and the audio device upon receiving the audio device at the first receptacle; and communicating data with the audio device using the magnetic field, the data to be stored at a non-volatile memory of the audio device to enable the audio device to provide the data to a second wearable device upon insertion of the audio device at a second receptacle of the second wearable device.

17. The method of claim 16, wherein initiating the operation includes loading a phone application at the first wearable device in response to detecting removal of the audio device from the first receptacle.

18. The method of claim 17, further comprising:

receiving an indication of a target phone number via the phone application; and placing the call to the target phone number using the first transceiver.

19. The method of claim 16, wherein initiating the operation includes answering the call.

20. The method of claim 16, further comprising terminating the call in response to detecting insertion of the audio device into the first receptacle.

21. The method of claim 20, further comprising initiating a charging operation to charge the audio device in response to detecting insertion of the audio device into the first receptacle.

22. The method of claim 16, wherein the voice data represents a signal generated by a microphone of the audio device, and further comprising providing the voice data from the second transceiver to the first transceiver.

23. An apparatus comprising:

means for communicating at a first wearable device using a first communication network associated with a first communication range;

means for communicating at the first wearable device using a second communication network associated with a second communication range that is less than the first communication range;

means for receiving an audio device at the first wearable device, the audio device configured to communicate using the second communication network; and means for forming a magnetic connection with the audio device upon receiving the audio device at the means for receiving the audio device and for communicating data with the audio device using the magnetic connection, the data to be stored at a non-volatile memory of the audio device to enable the audio device to provide the data to a second wearable device upon insertion of the audio device at a second receptacle of the second wearable device.

24. The apparatus of claim 23, further comprising means for securing the first wearable device to a wrist of a user.

* * * * *